US010311703B1

(12) United States Patent
Hayzen et al.

(10) Patent No.: US 10,311,703 B1
(45) Date of Patent: Jun. 4, 2019

(54) DETECTION OF SPIKES AND FAULTS IN VIBRATION TREND DATA

(71) Applicant: Computational Systems, Inc., Knoxville, TN (US)

(72) Inventors: Anthony J. Hayzen, Knoxville, TN (US); Christopher G. Hilemon, Knoxville, TN (US); John W. Willis, Oak Ridge, TN (US)

(73) Assignee: Computational Systems, Inc., Knoxville, TN (US)

( * ) Notice: Subject to any disclaimer, the term of this patent is extended or adjusted under 35 U.S.C. 154(b) by 0 days.

(21) Appl. No.: 15/892,645

(22) Filed: Feb. 9, 2018

(51) Int. Cl.
G08B 21/18 (2006.01)
G06F 7/02 (2006.01)
G06F 16/21 (2019.01)

(52) U.S. Cl.
CPC .......... G08B 21/187 (2013.01); G06F 7/02 (2013.01); G06F 16/21 (2019.01)

(58) Field of Classification Search
CPC .... G08B 21/18; G08B 21/182; G08B 21/187; G08B 23/00; G06F 17/30286; G06F 17/30289; G06F 7/02; G06F 7/023; G06F 7/026; G06F 16/21
See application file for complete search history.

(56) References Cited

U.S. PATENT DOCUMENTS

| 4,631,683 | A | 12/1986 | Thomas et al. |
| 6,301,151 | B1 | 10/2001 | Engh et al. |
| 7,124,637 | B2 | 10/2006 | Singhal et al. |
| 7,277,843 | B1 * | 10/2007 | Wen ........................ H04L 43/02 703/21 |
| 7,308,322 | B1 | 12/2007 | Discenzo et al. |
| 7,752,012 | B2 | 7/2010 | Kavaklioglu |
| 8,380,447 | B2 | 2/2013 | Bechhoefer |
| 9,483,049 | B2 | 11/2016 | Maeda et al. |
| 2007/0260656 | A1 | 11/2007 | Wiig |
| 2008/0208527 | A1 | 8/2008 | Kavaklioglu |
| 2015/0235544 | A1 * | 8/2015 | Hernandez ............. E21B 44/00 340/853.1 |
| 2017/0219461 | A1 * | 8/2017 | Duncan ............... G01M 99/008 |

FOREIGN PATENT DOCUMENTS

EP 0018853 B1 10/1984

* cited by examiner

Primary Examiner — Brian Wilson
(74) Attorney, Agent, or Firm — Luedeka Neely Group, P.C.

(57) ABSTRACT

A machine monitor includes sensors producing a series of scalar values corresponding to sensed physical parameters. An analyzer produces a first database based on the scalar values and determines a median value of the scalar values for each sensor. It also sets a spike level that is offset from the median value by a predetermined multiple of the median value. A spike filter in the analyzer compares the scalar values to the spike level, and identifies a particular scalar value as a potential spike when the particular scalar value differs from the median value by an amount that is equal to or greater than the spike level. A potential spike is determined to be an actual spike if the first and second side values are within a predetermined range of the median value. A second database is produced with the actual spikes eliminated. Using the second database, corrected faults are identified by finding a data point that exceeds a danger level with a preceding data point exceeding a warning level and two trailing data points being less than an advise level.

14 Claims, 12 Drawing Sheets

DETECTION OF SPIKES AND FAULTS IN VIBRATION TREND DATA

FIELD

The present invention relates to the field of collecting and analyzing vibration data, and particularly relates to an apparatus that collects, corrects and analyzes vibration data.

BACKGROUND

In the collection of vibration data, spikes in the data can reduce the reliability of vibration data analysis because a spike could be mistaken as a fault. A data "spike" is defined as a change in a measured value which is unreasonable due to rate of change from previous values, difference in magnitude from previous values, or both. Typically, the "spike" is of short duration, and appears as a very sharp positive or negative excursion on the processed data plot.

Raw vibration data collected by either portable or continuous online vibration devices may be subject to a variety of noise inputs which may manifest as spikes in the processed data. These noise inputs can arise from poor wiring installations, bad cables to vibration sensors, static electric discharges, electromagnetic pickup from external sources such as a noisy electric motor or some other source.

It should be noted that some spikes in the processed data may be legitimate changes in vibration levels or harmonic content due to some sort of fault with the machine being monitored. In general, there are most often other indications (such as a steady increase in trended values) that something is changing in the behavior of the machine.

Spikes in the real-time or historical vibration data can lead to false alarms being generated. Conversely, if historical data is being used to set alarm limits, spikes in the data may result in alarm limits that are too loose, which may result in problems being missed or being alerted to problems too late.

Different techniques have been developed to identify and eliminate spikes from various forms of data. In general, prior art techniques rely on some type of mathematical or statistical analysis to identify outlier data and eliminate a spike as an outlier.

For example, U.S. Pat. No. 7,308,322 discloses a method in which attributes of a motorized system are measured where the attributes are at least one of vibration, speed, temperature, pressure, etc. One step of the method is the elimination of outliers. Certain data patterns are excluded from the data as outliers and extraordinarily large or small data values are typically excluded. US20070260656A1 searches out and subtracts both outlier data and edge data in a method for diagnosing a mechanism. U.S. Pat. No. 7,124,637 discloses a method for determining vibration amplitude limits of a mechanical device. The collected data is corrected using outlier detection procedures that are known in the art. German application DE102010013594A1 discusses measuring outer contours of an object and ignoring individual outliers that may be caused by a speck of dust at the measuring point. U.S. Pat. No. 7,752,012 discloses a method for detecting an abnormal situation associated with the process plant. Specialized data filters and data processing techniques are used to produce enhanced data and such enhanced data may be trimmed to remove outliers. U.S. Pat. No. 9,483,049 B2 discloses an extremely complicated and mathematically intensive method for detecting anomalies in sensed data, including outliers, and rejecting them.

U.S. Pat. No. 4,631,683 discloses a tool that includes a detection system that avoids false alarms caused by noise spikes. EP0018853B1 discloses a technique for discriminating electrical noise spikes from actual impact signals.

These prior art techniques are time consuming to execute and are not well suited for monitoring scalar vibration data from a variety of machines for purposes of preventative maintenance. In other words, these techniques require too much processing time and are slow, and they do not work well in a preventive maintenance environment.

SUMMARY OF THE INVENTION

The present invention overcomes the disadvantages of the prior art by using an apparatus and method that is configured to filter data and generate a new database that is free from spurious data, namely, noise spikes. Because the apparatus is particularly designed for vibration data of the type normally used for preventative maintenance, it is faster than the prior art and transforms noisy data into a noise spike free database efficiently and quickly. To increase accuracy and speed, the apparatus of the present invention analyzes vibration data to identify corrected faults in a manner that is inherently protected from noise spikes by the technique used to identify corrected faults that is inherently immune to many forms of spiky noise. Again, the technique for identifying corrected faults is designed specifically for data generated for preventative maintenance of machinery, and is faster and more efficient than known techniques.

In accordance with one form of the present invention, an apparatus for monitoring machines includes at least one sensor for sensing physical parameters (such as vibration or electrical properties) produced by the machines and for producing a series of scalar values corresponding to the sensed physical parameters. An analyzer is connected to the sensor and, for each of the sensors, it operates to receive the scalar values, produce a first database based on the scalar values, determine a median value of the scalar values and determine a spike level that is a predetermined multiple of the median value.

The median value may be calculated using all available data, including noise spikes, because there are few noise spikes compared to real data, and the calculation of the median value will inherently ignore outliers like a noise spike or a fault. However, in other embodiments the second database may be used for the median calculation to ensure that noise spikes will not influence the calculation of the median. In other embodiments where corrected faults are identified, the median calculation may begin shortly after the prior corrected fault and continue to the present time.

A spike filter is implemented in the analyzer and, for each sensor, the filter operates to compare the scalar values to the spike level, and identify a particular scalar value as a potential spike when the particular scalar value is equal to or greater than the spike level of the sensor. The analyzer also identifies first and second side scalar values, where the first side scalar value is immediately before the potential spike value and the second side scalar value is after the potential spike value. It then compares the first and second side scalar values to the median value, and identifies the potential spike as an actual spike if the first and second side values are within a predetermined range of the median value for the sensor. With this information, it produces a second database corresponding to the first database with the actual spikes eliminated, and thus a plurality of second databases are produced by the spike filter with one of the second databases being produced for each of the sensors. The analyzer operates on the second databases to determine characteristics of each machine based on the second databases. The term "eliminated" is used in a broad sense herein. To eliminate the noise spikes from the second database, the scalar value creating the spike may physically be removed such that the scalar value does not exist in the second data base, or the scalar value creating the noise spike may be marked electronically, as with a pointer, such that the analyzer will know to ignore the data point when analyzing the remaining data for purposes such as finding corrected faults. In either case the scalar values creating the noise spikes are "eliminated". In the latter case where the scalar values are electronically marked, the second database will be the first database with certain scalar values electronically marked.

The analyzer may include an input for receiving input data which may include the predetermined multiplier and the predetermined range for each sensor. A typical multiplier is about 10 and a typical predetermined range is about 10% of the median, but these values may be adjusted by a user to fit a particular environment. In general, the multiplier and the range are increased for noisy applications and decreased for applications.

The analyzer also may be configured to analyze the second databases to identify scalar data corresponding to corrected machine faults for at least one sensor. To do this, the analyzer compares each scalar value in one of the second databases to a predetermined alarm limit and identifies each scalar value that exceeds the predetermined alarm as a potential corrected fault. For each potential corrected fault, it identifies a first prior scalar value that is immediately prior to the potential corrected fault and compares the first prior scalar value to a predetermined warning level. For each potential corrected fault, it identifies first and second trailing scalar values that are immediately after the potential corrected fault, and compares the first and second trailing scalar values to a predetermined advise level. For each potential corrected fault, if the first prior scalar value exceeds the warning level and the first and second trailing scalar values are less than the advise level, it identifies the potential corrected fault as an actual corrected fault.

The analyzer may also be configured to associate a time with each scalar value in the first and second databases and determine the time of each corrected fault for at least one sensor based on the second database for the at least one sensor. Then a mean time between faults may be calculated based on the time of each corrected fault of the at least one sensor. An input may be provided on the analyzer for receiving input data, and the analyzer will be configured to receive input data corresponding to the predetermined advise warning and alarm levels for each of the sensors.

In accordance with another aspect of an embodiment, the second database (representing corrected data) may be used to set alarm limits and other limits. For example, the analyzer may be programmed to recalculate the spike level, danger level, warning level, advise level and median value of the data based on the second database. The analyzer may have the various levels set as a percentage of the median value (or as an absolute value difference with respect to the median), and when the analyzer creates the second database, it will recalculate the median value and then reset all other levels based on the new median value.

In accordance with a particular embodiment, the apparatus includes at least one sensor for sensing physical parameters produced by the machines and for producing a series of scalar values corresponding to the sensed physical parameters, and an analyzer connected to the at least one sensor. For at least one of the sensors, the analyzer operates to receive the scalar values and produce at least one database based on the scalar values. The analyzer is further configured to analyze the database to identify scalar data corresponding to corrected machine faults, and for the at least one sensor, the analyzer operates to compare each scalar value in the database to a predetermined alarm limit, and identify each scalar value that exceeds the predetermined alarm limit as a potential corrected fault.

For each potential corrected fault, the analyzer identifies a first prior scalar value that is immediately prior to the potential corrected fault and compares the first prior scalar value to a predetermined warning level. Also, for each potential corrected fault, the analyzer identifies first and second trailing scalar values that are immediately after the potential corrected fault, and compares the first and second trailing scalar values to a predetermined advise level. If the first prior scalar value exceeds the warning level and the first and second trailing scalar values are less than the advise level, the analyzer identifies the potential corrected fault as an actual corrected fault.

In this embodiment the analyzer may be configured to associate a time with each scalar value in the database; determine the time of each corrected fault for at least one sensor based on the database for the at least one sensor; and calculate a mean time between faults based on the time of each corrected fault of the at least one sensor.

From the above discussion it may be appreciated that the analyzer is capable of quickly analyzing data to remove spikes and identify corrected faults with a speed and accuracy that is not possible using prior art statistical and mathematical techniques for filtering for outliers.

BRIEF DESCRIPTION OF THE DRAWINGS

The present invention may best be understood by reference to an embodiment shown in the Drawings in which.

DETAILED DESCRIPTION

Figure 1:
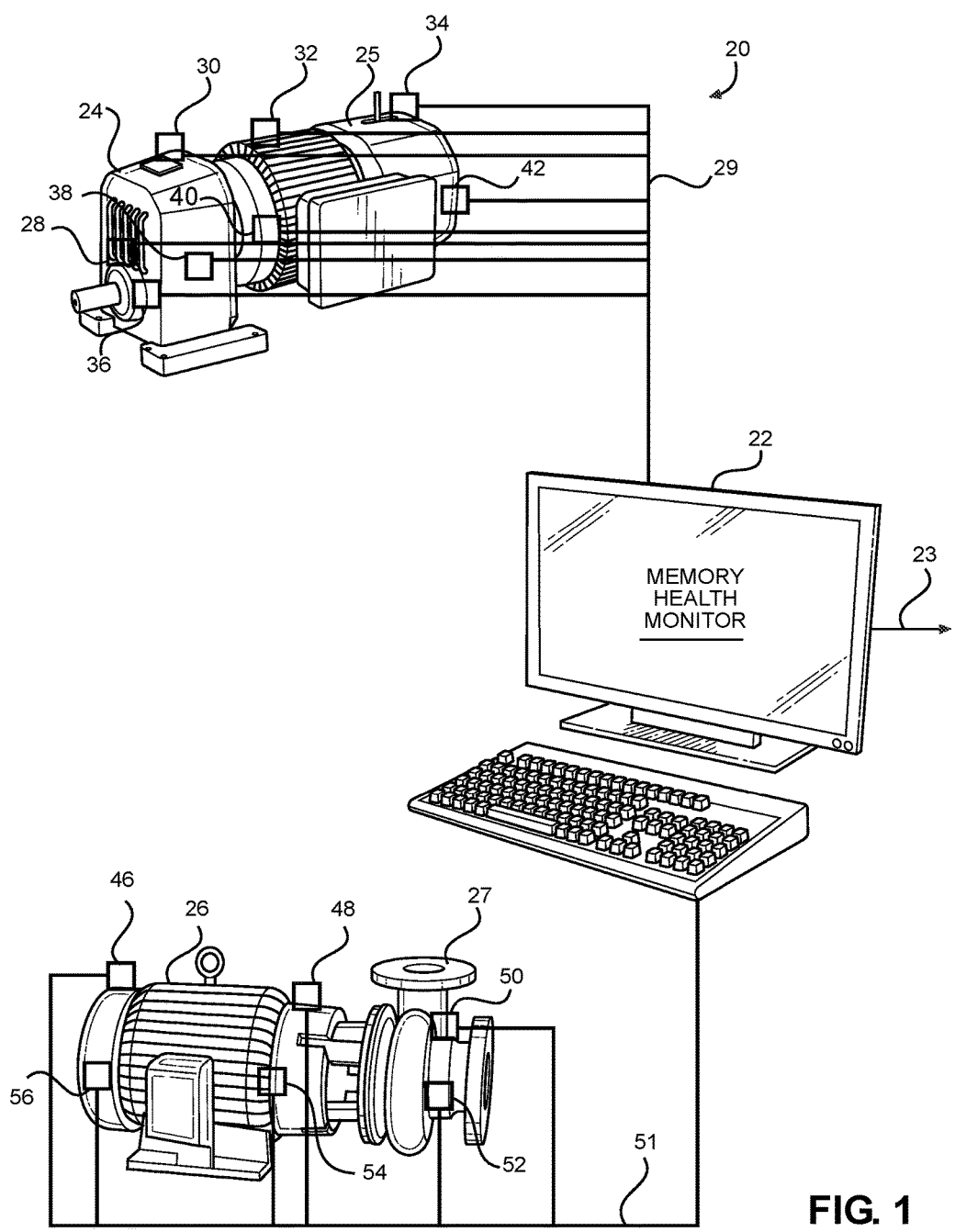
FIG. 1 is somewhat diagrammatical circuit diagram illustrating a machinery health monitor connected to sensors on a plurality of machines.

Referring now to FIG. 1, there is shown a somewhat diagrammatic circuit diagram 20 representing multiple embodiments of the present invention. A machinery health monitor 22 is connected to monitor a mechanical transmission 24 that is driven by a motor 25, which is also monitored, and is connected to monitor a motor 26 that is driving a pump 27, which is also monitored. This equipment (24, 25, 26 and 27) represents a plurality of machines, and in most cases the machinery health monitor 22 would be monitoring many more such machines in a plant. This example is simplified for purposes of illustration. In FIG. 1 vertically oriented vibration sensors 28 and 30 are mounted on the transmission and vertically oriented vibration sensors 32 and 34 are mounted are mounted on the motor 25 producing vertical vibration signals corresponding to the vertical vibration sensed at their respective locations. Similarly horizontal vibration sensors 36, 38, 40 and 42 are mounted on the transmission 24 and motor 25 to sense horizontal vibration and produce corresponding horizontal vibration signals. The vertical vibration signals and the horizontal vibration signals are transmitted from the sensors (28,30,32,34,36,38,40 & 42) through lines 29 to the machinery health monitor. The lines 29 may be physical lines or wireless communication paths, and the signals transmitted on lines 29 are typically digital, but could be analog signals.

The motor 26 and pump 27 are similarly monitored by the monitor 22. Vertical sensors 46, 48 and 50 produce vertical vibration signals corresponding to the vertical vibration at their respective mounting positions and horizontal vibration sensors 52, 54 and 56 produce horizontal vibration signals corresponding to the horizontal vibration at their respective mounting positions. The horizontal and vertical vibration signals are communicated on lines 51 to the monitor 22, and lines 51, like lines 29, may be physical wires or they may represent wireless communication paths.

As suggested above, the machinery health monitor 22 may represent a variety of different physical configurations. The sensors on the machinery, such as sensor 30, may be simple vibration sensors, or other sensors, that detect a physical parameter (such as vibration, temperature, sound, ultrasonic sound, visible light, infrared light, a magnetic field or an electrical field) and transmit a signal to the machinery health monitor 22 in a raw form. Then, processing, such as filtering and decimation, can be performed in the machinery health monitor 22. Alternatively, the sensors on the machinery may be smart sensors that work independently to some extent of the machinery health monitor 22. The sensors may wake up, configure themselves to create a sensor signal, convert the signal to a digital format, process the signal such as by filtering and decimation, store the signal, and at a designated time transmit the signal to the monitor 22. In yet another alternative embodiment, the machinery health monitor 22 may represent a portable monitor or analyzer that is physically transported to each machine that is monitored, and a single sensor is used to collect all of the data. For example, a single sensor could be first positioned vertically as sensor 28, and after the data is collected, the single sensor could be moved to a horizontal position and placed as sensor 36 to collect horizontal vibration data.

Figure 2:
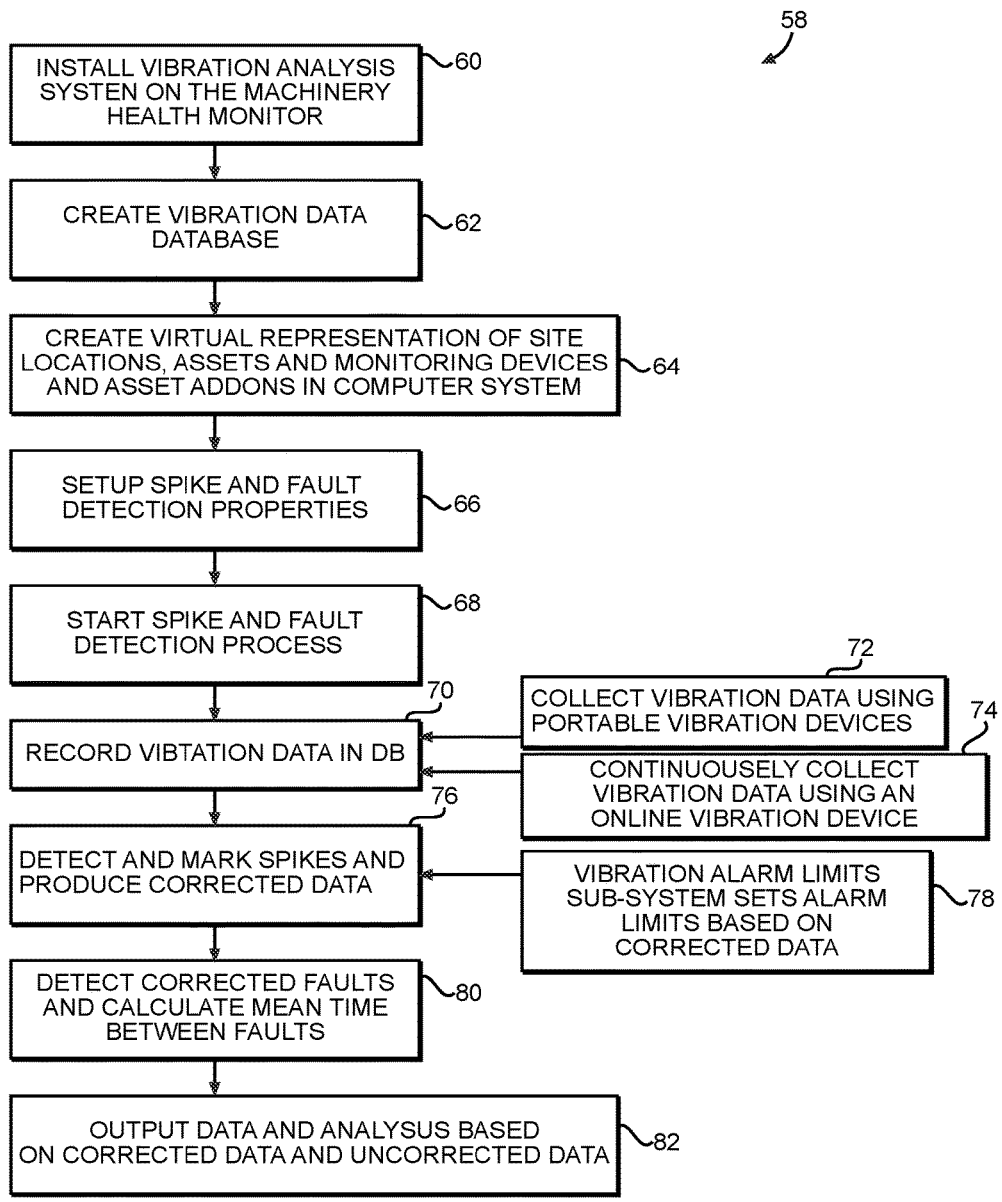
FIG. 2 flow chart illustrating the operation of the machinery health monitor in accordance with one embodiment of the present invention.

Referring now to FIG. 2, a flow diagram 58 is shown illustrating the operation of the machinery health monitor 22 when implementing embodiments of the present invention. As indicated by block 60, the first step in implementing this invention is to install the appropriate software, which includes software to implement the methods of the present invention as well as the other software needed to perform various analyses and processing of the data typically required in machinery health maintenance. Next, as indicated by block 62, the machinery, such as transmission 28, pump 27 and motors 25 and 26 are monitored with sensors to produce one or more databases. For example, a database of scalar values may be produced for each sensor, such as sensor 28, and preferably each scalar value will be associated with a timestamp indicating the time at which the value was obtained. The scalar value may be obtained after appropriate processing has been performed. For example, the machinery health monitor 22 and software may be programmed to monitor the peak displacement amplitude of the vibration detected by sensor 28 within a specific frequency range. Thus, the signal from sensor 28 would be filtered to eliminate all vibration signals except for sensor signals related to vibration within the specific frequency range. A scalar value would then be generated to indicate the peak displacement amplitude over a predetermined period of time, which may be milliseconds for high frequency measurements or seconds or hours or days for low frequency measurements. In a machinery health application measuring vibration, the predetermined period of time would be a matter of a few seconds for most measurements. This scalar value would then be saved along with a timestamp, and the process would be repeated for each of the sensors monitored by the machinery health monitor 22.

As indicated by block 64, the setup of the software of health monitor 22 would include the creation of virtual representations of site locations, assets, monitoring devices and asset add-ons in the computer system. Thus, the predictive maintenance software in the monitor 22 is set up to produce multiple databases corresponding to multiple sensors. Then, as indicated by block 66, setup must be performed for purposes of eliminating noise spikes and for the purpose of detecting corrected faults in the data. For each sensor, this setup may include user input specifying a predetermined range around the median of the scalar values for a particular sensor. For example, the predetermined range may be 10%, meaning 10% of the median value of the scalar values for a particular sensor. Also, a value may be provided by the user to specify the minimum scalar value that may be considered a noise spike. This minimum scalar value may be expressed as a multiple of the median value and a typical multiple would be 10. The monitor may also include default values for the predetermined range and multiplier, such as 10% and 10. Using the default values, in order to be considered a noise spike, a scalar value must have an amplitude that equals or exceeds 10 times the median value of the scalar values generated by a particular sensor and the data points before and after the noise spike must have a scalar value within 10% of the median value of the scalar values for this particular sensor. The user may also set a minimum length of time for data to be collected before the median value is calculated and, if not set by the user, the monitor 22 may use a default value, which would typically be a few seconds or more.

The fault detection properties may also be set up by the user for each sensor or default values may be used. For example, the user may provide information setting three values which will represent a danger level, a warning level, and an advise level. As discussed in greater detail hereinafter, a corrected fault is identified within the database when a particular data point (scalar value), has a value greater than or equal to the danger limit, and the prior data point has a value greater than or equal to the warning limit, and the two data points immediately following the particular point have values that are below the advise limit.

Alternatively, the user may set the program to identify a corrected fault when it identifies a particular data point having a value equal to or greater than the warning limit; and the immediately preceding data point has a value equal to or greater than the advise level; and the two data points following the particular data point have a value below the advise level.

Block 68 indicates the beginning of the detection process for finding noise spikes and corrected faults. As indicated by block 70, the first step is to record vibration data in the databases created by the machinery health monitor 22. As indicated by steps 72 and 74 the vibration data may be collected using portable vibration collection devices or by using online vibration collection devices. The illustration of FIG. 1 is intended to represent both types of vibration collection devices. Typically, the user will set a minimum length of time to collect data before it is analyzed with the present invention. After the data has been collected, it is first analyzed by the machinery health monitor 22 to eliminate noise spikes. The analyzer would first calculate the median value of the scalar values for a particular sensor. Then, the analyzer would calculate the range around the median value that was previously set by the user or use the default value. For example, the user may have set a 10% value, and the analyzer would calculate the range to be the median value plus or minus 10% of the median value. This would be considered the median range. Next the analyzer would calculate the minimum peak value. For example, assuming the user has set the multiplier to be 10, the analyzer would calculate the minimum peak value by multiplying the median value by 10. Then, all scalar values of the database for this particular sensor would be scanned to identify any data points having a scalar value equal to or exceeding the minimum peak value. If a particular data point meets this criteria, the database would then be analyzed to determine whether the data points immediately preceding and immediately following the particular data point had a scalar value that was within the median range as described above. If so, the particular data point would be identified as a noise spike.

As indicated by block 76, after all of the data for a particular sensor has been analyzed to identify noise spikes, a second database is created in which the noise spikes are eliminated. By eliminated, it is meant that the data points representing noise spikes may be physically removed from the second the database, or the data points representing noise spikes may be electronically identified, as by pointers, in the second database so that they may be ignored when performing other analyses of the second database, such as identifying corrected faults. The second database may be regarded as corrected data.

As indicated by block 76, vibration alarm limits may be reset based on the corrected data. For example, a user may wish to set scalar value levels representing an advise level, a warning level and an alarm level. Typically, these levels are set as a percentage of the median value of the data generated by a particular sensor. For example, an advise level may be 2 times the medium scalar value, and a warning level may be 4 times the median scalar level. The alarm level may be 6 times the median level. Thus, the elimination of noise spikes in the corrected data would lower the median value of the data and would therefore lower all of the levels that are dependent upon the median value of the data.

In addition, as indicated by block 80, the corrected data may be used to detect corrected faults and to calculate the mean time between faults. Again, the corrected data is used in which the data representing noise spikes have been eliminated. Thus, the noise spikes will be ignored. To identify corrected faults, the data is first analyzed to identify each data point that exceeds an alarm limit, and such data points are regarded as potential corrected faults. Then, each potential corrected fault is analyzed to determine whether the preceding data point is greater than a warning level and whether the two following data points are smaller than the advise level. If both queries are answered positively, then the potential corrected fault is identified as a corrected fault. Each of the data points representing corrected faults will also include a timestamp. So, the mean time between failures may be easily calculated by using the timestamps to calculate the time duration between each adjacent fault to thereby determine multiple time durations, and then calculating the mean of the multiple time durations to determine the mean time between faults.

As indicated by block 82, after the analysis has been performed for all of the data, the machinery health monitor 22 will output all of its data on output 23 which is typically connected to a centralized computer system or it may be connected to a cloud-based computer system. The data provided by the machinery health monitor would typically include both the corrected data and the uncorrected data as well as the analysis performed on the corrected data.

Figure 3:
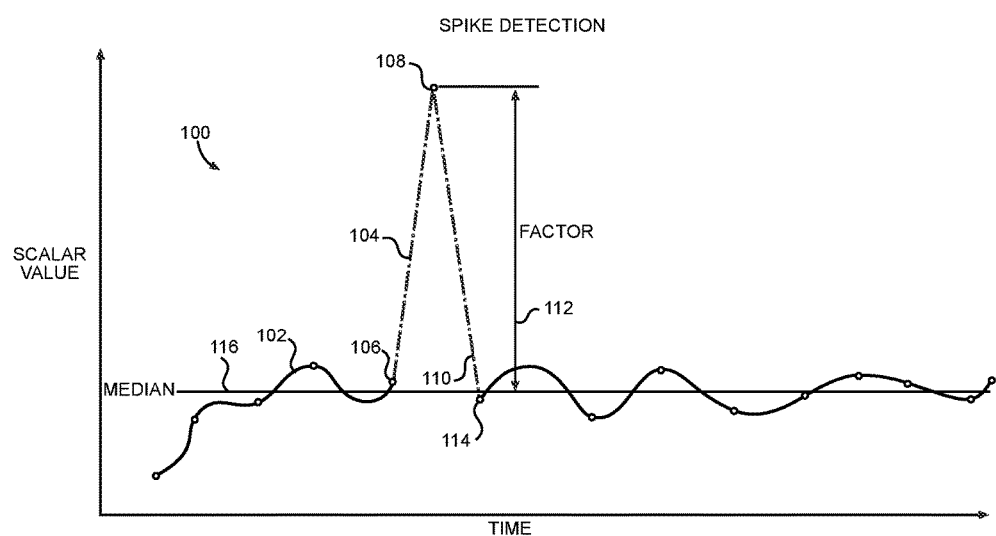
FIGS. 3-6 are graphs of sensor signals illustrating spikes that would be eliminated as noise spikes by the present invention and also illustrating abrupt spikes in the signal that would be preserved as possible data and would not be characterized as noise spikes.
Figure 4:
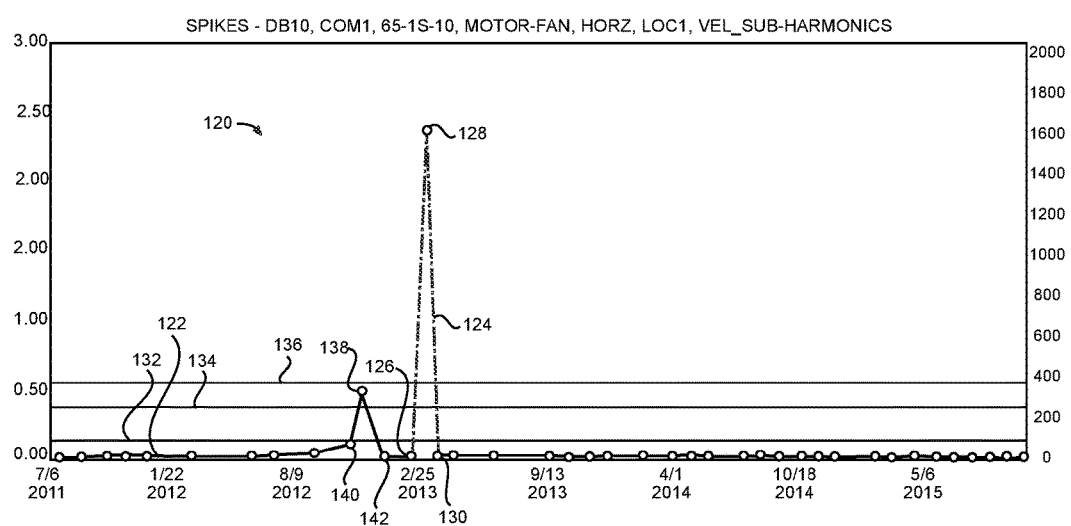

Referring now to FIG. 3, a generic graph of scalar values is shown illustrating a noise spike in which the vertical axis represents scalar values and the horizontal axis represents time. The solid line 102 represents a curve fitted to a plurality of data points representing measurements of scalar values taken by a sensor, such as sensor 28. The dotted line 104 represents a curve fitted through data points representing a noise spike. The data point 108 represents a scalar value produced by noise, such as a shaken or jolted sensor. In this case, the data points 106 and 114 represent the data points immediately before and after the spike data point 108, and the data points 106 and 114 are well within 10% of the median value of all data points which is represented by the horizontal line 116. The minimum value of a data point that may be regarded as a spike is determined by multiplying the median value by a multiplication factor such as 10. In this case, the median value times the multiplication factor is represented by the line 112, and it will be seen that the data point 108 is exactly equal to the level necessary to be regarded as a spike. Thus, all conditions are met and the data point 108 is regarded as a noise spike and it is eliminated from the second database (the corrected data). It will be understood that the test for a noise spike may be equally applied to negative spikes as well as positive spikes Referring now to FIG. 4, there is shown another graph 120 illustrating scalar data collected from a sensor. In graph 120 the solid line 122 represents a graph line fitted through valid data points generated by scalar data from the sensor. The dotted line 124 represents a graph line fitted through the valid data points plus a data point 128 representing a noise spike. In this case, the valid data points are fairly consistent except for two outliers, namely data point 128 and data point 138. In this case the data point 128 is more than 10 times the median value of the data points, and the adjacent data points 126 and 130 are within 10% of the median value of the data points, so data point 128 is regarded as a noise spike and will be eliminated.

Data point 138 fails the test for a noise spike because its value is not 10 times the median value of the data points. In this case, data point 138 also fails the test for a corrected fault. The scalar value level defined as an advise level is represented by line 132. The warning level is represented by line 134 and the alarm level is represented by line 136. Under the standard test for a corrected fault, the scalar value of the data point must exceed the alarm level 136, and it does not. Under an alternate test, a corrected fault may be defined as a data point having a value that exceeds the warning level 134 provided the preceding data point 140 exceeds the advise level 132 and the following two data points 142 and 126 are less than the advise level 132. The trailing data points 142 and 126 meet the prescribed test, but the preceding data point 140 does not. Thus, the data point 138 is not a corrected fault under the alternative test either.

The software is configured to allow a user to set the advise warning and alarm levels, and this action is an indirect setting of the spike test and the corrected fault test as well.

In addition, the software is configured to allow the user to directly modify the spike test and the corrected fault test. In one embodiment the software requires the user to set a range around the median and a multiplier factor for the noise test. In another embodiment, the user may set absolute values for the minimum amplitude necessary for a data point to satisfy the spike test, and for the range within which the preceding and trailing data points must be found in order to satisfy the spike test. Similarly, the software is configured in one embodiment to allow the user to provide settings for the corrected fault test. That is, the user may set a minimum value for a data point to be considered a corrected fault, set a minimum value for the preceding data point, and set a maximum value for the two trailing or following data points.

Figure 5:
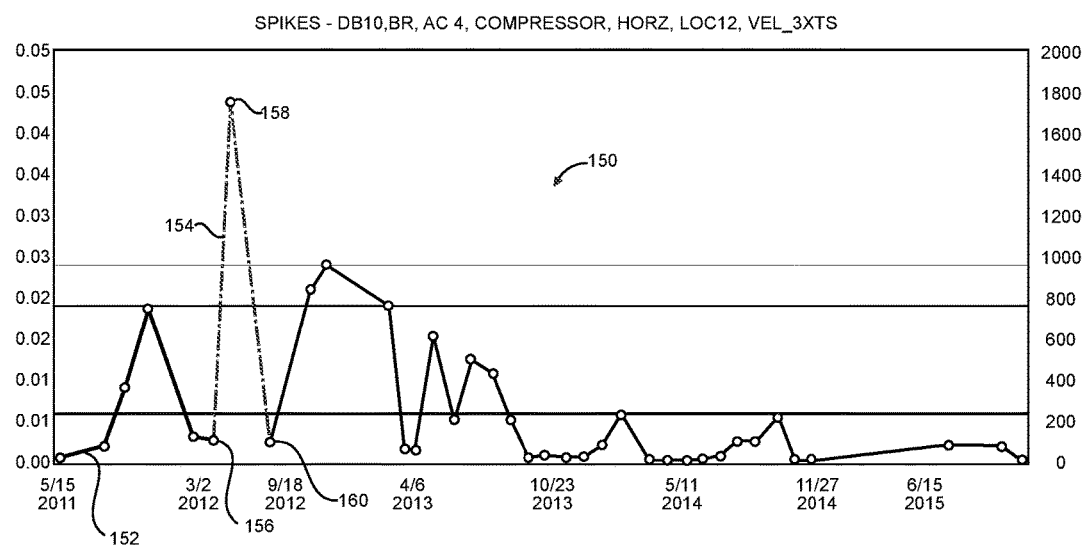

FIG. 5 represents another example of scalar data collected by a sensor which in this case was measuring the horizontal vibration of a compressor. The dotted lines 154 represent a noise spike because the data point 158 exceeds the minimum level required to be a spike and the two adjacent data points 156 and 160 are within the predetermined range of the median value of the data. Even though the remaining data is quite erratic, none of the data points fit the definition of a spike or a corrected fault.

Figure 6:
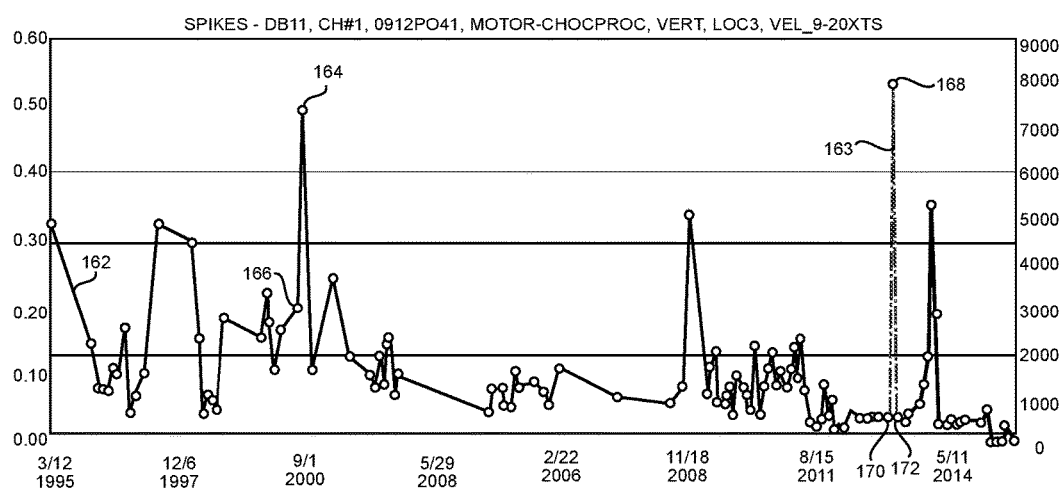

FIG. 6 is an example of scalar data collected from a vertical vibration sensor on a motor. Again, the solid line 162 represents a graph tracing the valid data points created by the vertical vibration sensor. The dotted line 163 represents a graph tracing to a data point 168 representing a noise spike. Again, data point 168 represents a spike because it's scalar value exceeds the required minimum value and the preceding data point 170 and trailing data point 172 are within 10% of the median value of the data. The remaining sharp peaks in the data fail the noise spike test. For example, data point 164 fails the test because the preceding data point 166 is not within 10% of the median value of the scalar data.

Figure 7:
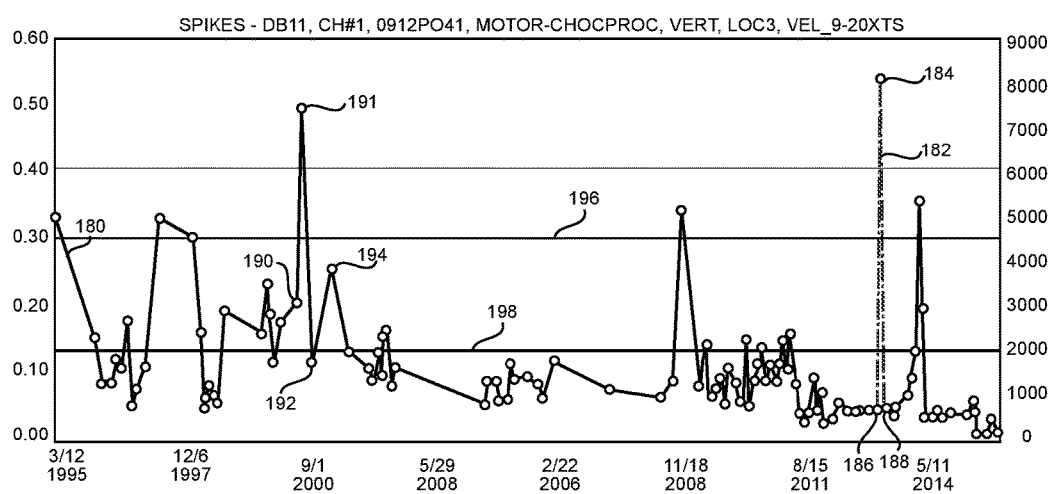
FIG. 7 is a graph illustrating fault correction detection in the data after the noise spikes have been identified and eliminated.

FIG. 7 represents another graph showing scalar value data points taken from a vertical sensor on the motor. The solid line 180 is traced through valid data points and the dotted line 184 is traced through a noise spike data point 184. The preceding data point 186 and the following data point 188 are both within 10% of the median value of the scalar values and therefore the test for a noises spike is met. Data point 191 does not meet the noise spike test because the preceding data point 190 is not within 10% of the median value of the data points. It does not meet the test for a corrected fault because the preceding data point 190 is not greater than the warning level indicated by line 196. Also, the second succeeding data point 194 is less than the advise level as indicated by line 198.

Figure 8:
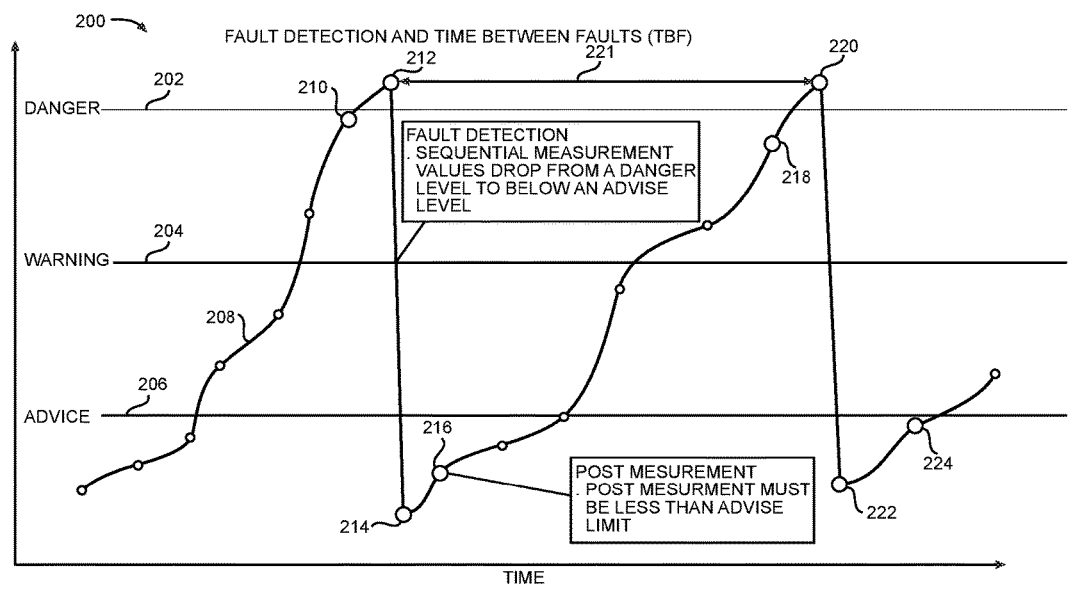
FIG. 8 is a graph illustrating two corrected faults that are detected and the time between faults that is measured.

Referring now to FIG. 8, a generic graph 200 is shown representing corrected data with a graph line 208 fitted to data points representing scalar data from the sensor. As before, in FIGS. 8-12 the vertical axis represents the magnitude of scalar values, and the horizontal axis represents time. In FIGS. 8-12, a danger level is indicated by a line 202; a warning level is indicated by a line 204; and an advise level is represented by a line 206. The data point 212 represents a corrected fault and would be detected as such by the apparatus of the present invention. The data point 210 that precedes the data point 212 is greater than the warning level 204 and thus meets the first criteria of the corrected fault test. The data points 214 and 216 are immediately following data point 212 and are less than the advise level. Thus, the second criteria of the corrected fault test is also passed. Likewise, the data point 220 also meets the criteria of a corrected fault because its value exceeds the danger level. The preceding data point 218 is greater than the warning level 204 and the succeeding data points 222 and 224 are less than the advise level 206. The time between the data points 212 and 220 is represented by arrowed line 221, which represents the time between faults. For a particular sensor, a mean time between failures may be determined by first determining the time at which multiple corrected faults have occurred, determining the time duration between each adjacent corrected faults and then determining a mean of the multiple time durations.

Figure 9:
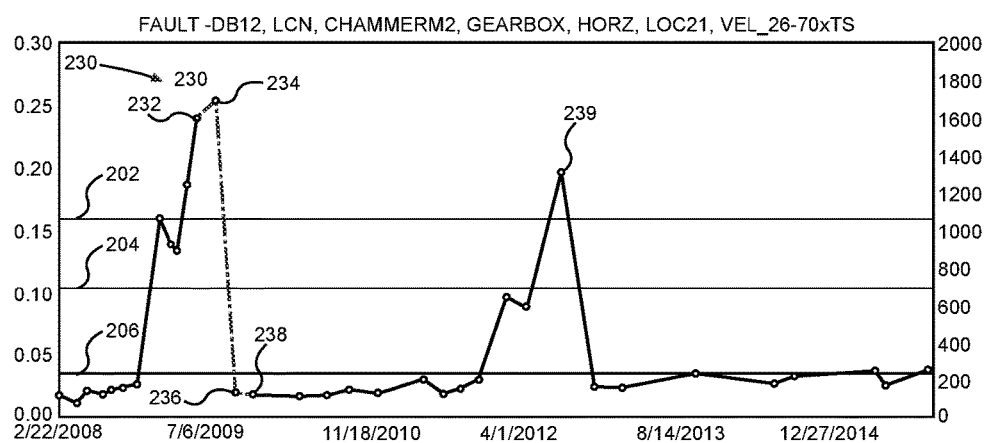
FIGS. 9-12 are graphs illustrating variations in the types of corrected faults that are detected.

FIG. 9 illustrates a graph of data points showing scalar values produced by a horizontal vibration sensor on a gearbox. In this graph, data point 234 represents a corrected fault because it's preceding data point 232 is greater than the warning level 204, and the two trailing data points 236 and 238 are both lower than the advise level 206.

Figure 10:
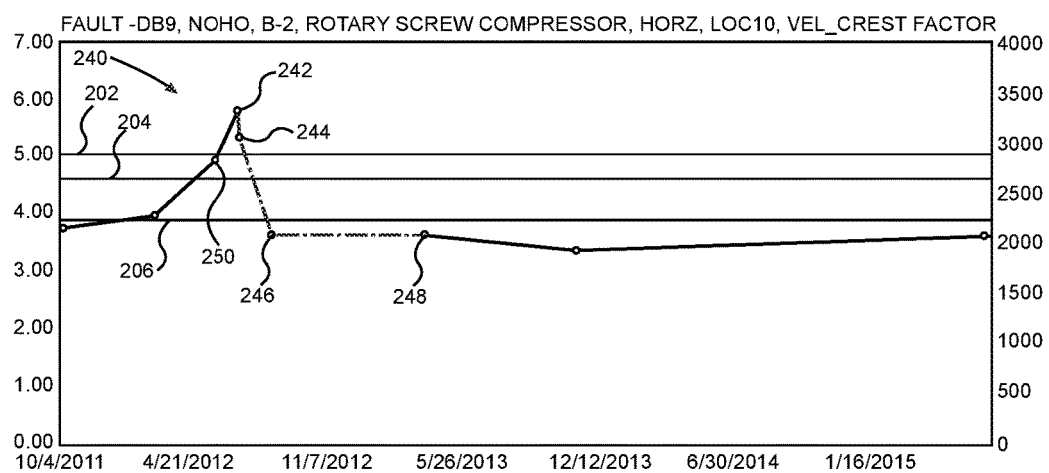

FIG. 10 shows a graph 240 representing scalar values from a horizontal vibration sensor on a rotary screw compressor. In this case, the data point 244 is identified as a corrected fault because it's preceding data point 242 has a scalar value greater than the danger level 202 and it's a trailing data points 246 and 248 are both less than the advise level 206. The data point 242 was not identified as a corrected fault because it's preceding data point 250 was not greater than the warning level 202 and because one of its trailing data points 244 was not less than the advise level 206. Thus, data point 242 represents a fault, but not a corrected fault.

Figure 11:
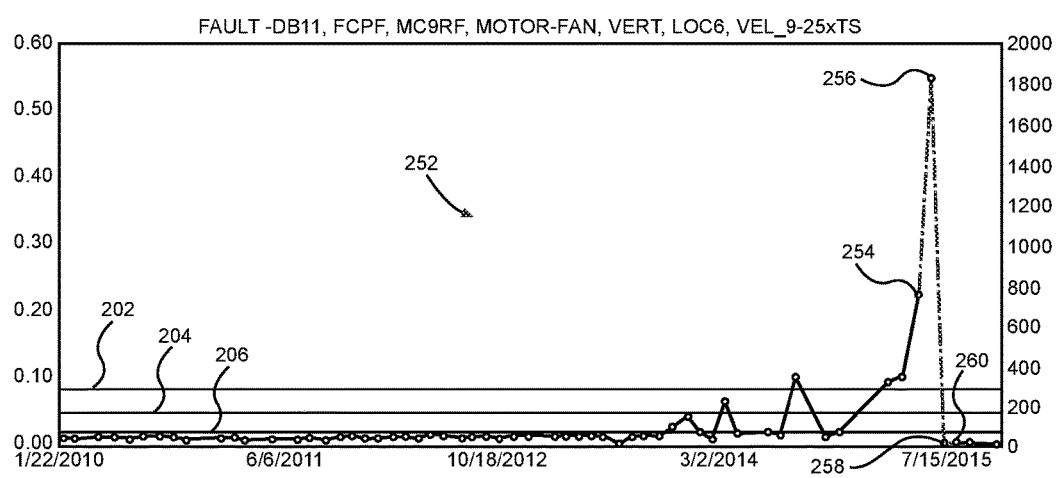

In FIG. 11, the graph 252 shows the data taken from a vertical vibration sensor on a motor-fan combination. Data point 256 is identified as a corrected fault because it's preceding data point press 254 is greater than the warning level 204, and the trailing data points 258 and 260 are less than the advise level 206.

Figure 12:
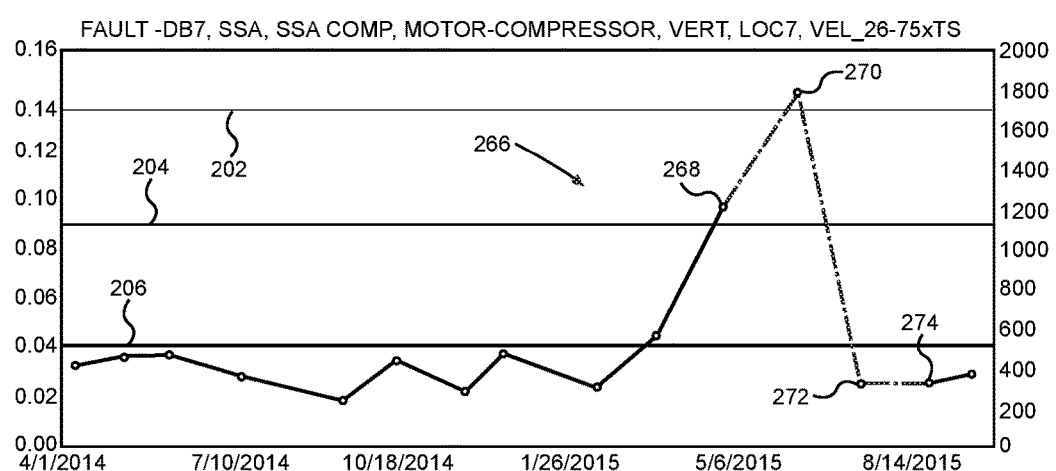

Likewise, in FIG. 12, a graph 266 represents data taken from a vertical vibration sensor on a motor-compressor combination. The data point 270 represents a corrected fault because the preceding data 268 is greater than the warning level 204 and the trailing data points 272 and 274 are both less than the advise level 206.

From the above discussion it will be appreciated that the various embodiments of the invention provide and improved and more efficient apparatus and method for identifying and eliminating noise spikes and for identifying corrected faults which may then be used to determine the mean time between faults. The examples and embodiments are intended to be non-limiting as to the scope of the invention which is defined by the appended claims.

What is claimed is:

1. An apparatus for monitoring machines comprising:
at least one sensor for sensing physical parameters produced by the machines and for producing a series of scalar values corresponding to the sensed physical parameters;
an analyzer connected to the at least one sensor and, for each of the machines, operating to:
receive the scalar values,
produce a first database based on the scalar values,
determine a median value of the scalar values for each sensor, and
determine a spike level;
a spike filter implemented in the analyzer and, for each sensor, operating to:
compare the scalar values to the spike level,
identify a particular scalar value as a potential spike when the particular scalar value differs from the median value by an amount that is equal to or greater than the spike level;

identify first and second side scalar values, the first side scalar value being immediately before the potential spike and the second side scalar value being after the potential spike, compare the first and second side scalar values to the median value, identify the potential spike as an actual spike if the first and second side values are within a predetermined range of the median value for the sensor, and produce a second database corresponding to the first database with the actual spikes eliminated, whereby a plurality of second databases are produced by the spike filter with one of the second databases being produced for each of the sensors; and the analyzer operating on the second databases to determine characteristics of each sensor based on the second databases.

2. The apparatus of claim 1 further comprising an input for receiving input data and wherein the analyzer is configured to receive the input data corresponding to a predetermined multiplier for each sensor.

3. The apparatus of claim 2 wherein the predetermined multiplier is about 10.

4. The apparatus of claim 1 further comprising an input for receiving input data and wherein the analyzer is configured to receive the input data corresponding to the predetermined range for each sensor.

5. The apparatus of claim 1 wherein the predetermined range is defined as a percentage of the median value.

6. The apparatus of claim 1 wherein the spike filter identifies both positive and negative actual spikes.

7. The apparatus of claim 1 wherein the analyzer is configured to analyze the second databases to identify scalar data corresponding to corrected machine faults, and for at least one sensor, the analyzer operates to:

compare each scalar value in one of the second databases to a predetermined alarm limit;

identify each scalar value that exceeds the predetermined alarm limit as a potential corrected fault;

for each potential corrected fault, identify a first prior scalar value that is immediately prior to the potential corrected fault, and compare the first prior scalar value to a predetermined warning level;

for each potential corrected fault, identify first and second trailing scalar values that are immediately after the potential corrected fault, and compare the first and second trailing scalar values to a predetermined advise level; and for each potential corrected fault, if the first prior scalar value exceeds the predetermined warning level and the first and second trailing scalar values are less than the predetermined advise level, identify the potential corrected fault as an actual corrected fault.

8. The apparatus of claim 7 wherein the analyzer is configured to:

associate a time with each scalar value in the first and second databases;

determine the time of each actual corrected fault for at least one sensor based on the second database for the at least one sensor; and calculate a mean time between faults based on the time of each actual corrected fault of the at least one sensor.

9. The apparatus of claim 7 further comprising an input for receiving input data and wherein the analyzer is configured to receive the input data corresponding to the predetermined advise level and the predetermined alarm limit for each of the sensors.

10. The apparatus of claim 7 wherein the analyzer is configured to set at least one of the predetermined advise level and the predetermined alarm limit based on the second database.

11. The apparatus of claim 7 wherein the analyzer is configured to set at least one of the predetermined advise level and the predetermined alarm limit which are based on a percentage of the median value of the second database.

12. An apparatus for monitoring machines comprising:

at least one sensor for sensing physical parameters produced by the machines and for producing a series of scalar values corresponding to the sensed physical parameters;

an analyzer connected to the at least one sensor and, for at least one of the sensors, operating to:

receive the scalar values and produce at least one database based on the scalar values;

compare each scalar value in the database to a predetermined alarm limit;

identify each scalar value that exceeds the predetermined alarm as a potential corrected fault;

for each potential corrected fault, identify a first prior scalar value that is immediately prior to the potential corrected fault, and compare the first prior scalar value to a predetermined warning level;

for each potential corrected fault, identify first and second trailing scalar values that are immediately after the potential corrected fault, and compare the first and second trailing scalar values to a predetermined advise level; and for each potential corrected fault, if the first prior scalar value exceeds the predetermined warning level and the first and second trailing scalar values are less than the predetermined advise level, identify the potential corrected fault as an actual corrected fault.

13. The apparatus of claim 12 wherein the analyzer is configured to:

associate a time with each scalar value in the database;

determine the time of each actual corrected fault for at least one sensor based on the database for the at least one sensor; and calculate a mean time between faults based on the time of each actual corrected fault of the at least one sensor.

14. An apparatus for monitoring machines comprising:

at least one sensor for sensing physical parameters produced by the machines and for producing a series of scalar values corresponding to the sensed physical parameters;

and an analyzer connected to the at least one sensor and, for each of the sensors, operating to:

receive the scalar values, produce a first database based on the scalar values, determine a median value of the scalar values for each sensor, and determine a spike level that is a predetermined multiple of the median value; and a spike filter implemented in the analyzer and, for each sensor, operating to:

compare the scalar values to the spike level, identify a particular scalar value as a potential spike when the particular scalar value differs from the median value by an amount that is equal to or greater than the spike level;

identify first and second side scalar values, the first side scalar value being immediately before the potential spike and the second side scalar value being after the potential spike, compare the first and second side scalar values to the median value, identify the potential spike as an actual spike if the first and second side values are within a predetermined range of the median value for the sensor, and produce a second database corresponding to the first database with the actual spikes eliminated, whereby a plurality of second databases are produced by the spike filter with one of the second databases being produced for each of the sensors.

* * * * *